United States Patent
Thiele et al.

Patent Number: 5,648,421
Date of Patent: Jul. 15, 1997

[54] ISOCYANATE/POLYOL CASTING RESIN

[75] Inventors: Lothar Thiele, Leichlingen; Hans-Peter Kohlstadt, Velbert; Nicole Schlingloff, Hilden; Claudia Plutniok, Düsseldorf, all of Germany

[73] Assignee: Henkel Kommanditgesellschaft auf Aktien, Duesseldorf, Germany

[21] Appl. No.: 564,065

[22] PCT Filed: Jun. 9, 1994

[86] PCT No.: PCT/EP94/01889

§ 371 Date: Dec. 14, 1995

§ 102(e) Date: Dec. 14, 1995

[87] PCT Pub. No.: WO95/00568

PCT Pub. Date: Jan. 5, 1995

[30] Foreign Application Priority Data

Jun. 18, 1993 [DE] Germany .............. 43 20 118.0
Jun. 18, 1993 [DE] Germany .............. 43 20 269.1

[51] Int. Cl.$^6$ .................................................. C08K 3/34
[52] U.S. Cl. ........................... 524/789; 524/791; 524/839; 524/847; 428/312.4; 428/312.6; 264/45.3; 523/142; 523/220; 521/122
[58] Field of Search ........................ 524/789, 791, 524/839, 847; 428/312.4, 312.6; 264/45.3; 523/142, 220; 521/122

[56] References Cited

U.S. PATENT DOCUMENTS 3,965,051  6/1976  Markusch et al. ............... 521/159

FOREIGN PATENT DOCUMENTS

| 0002513 | 6/1979 | European Pat. Off. . |
| 423643 | 4/1991 | European Pat. Off. . |
| 468608 | 1/1992 | European Pat. Off. . |
| 491268 | 6/1992 | European Pat. Off. . |
| 490277 | 6/1992 | European Pat. Off. . |
| 2098310 | 3/1972 | France . |
| 2123056 | 9/1972 | France . |
| 2295829 | 7/1976 | France . |
| 2673210 | 8/1992 | France . |
| 3339174 | 5/1985 | Germany . |
| 4023005 | 1/1992 | Germany . |
| 52-101270 | 8/1977 | Japan . |
| 57-029704 | 2/1982 | Japan . |
| 1348707 | 3/1974 | United Kingdom . |
| WO9218702 | 10/1992 | WIPO . |

OTHER PUBLICATIONS

"ADAC Motorwelt", No. 2, 1993, pp. 6, 7, and 8. Feb., 1993.

*Primary Examiner*—Rachel Gorr
*Attorney, Agent, or Firm*—Wayne C. Jaeschke; John Daniel Wood; Daniel S. Ortiz

[57] ABSTRACT

A composition useful as a casting resin is provided. The composition comprises a polyol, a polyisocyanate, a catalyst, and a suspension aid, and said catalyst and said suspension aid are present in the casting resin in such concentrations that, within 10 minutes of mixing, it flows downwards a) by at least 15 cm at 25° C. and b) by 3 to 0.3 cm at 130° C. The casting resin is particularly useful as a binder for a granular material in the production of open-cell moldings which are permeable to water.

31 Claims, No Drawings

ISOCYANATE/POLYOL CASTING RESIN

BACKGROUND OF THE INVENTION

1. Field of the Invention

This Invention relates to an isocyanate/polyol casting resin and to its use as a binder for granular material for the production of open-cell moldings.

2. Discussion of Related Art

Open-cell moldings, for example of pebbles, are known. Thus, paving sets which allow rain to pass through are described in the Journal "ADAC Motorwelt", No. 2, 1993, pages 6, 7 and 8. In particular, there is a report there on a "filter set" made up of small pebbles which, in the same way as a sponge, allows rainwater to trickle through exactly where it falls. It is suitable not only for car parks but also for footpaths and bicycle paths.

Open-cell moldings of thermoset polyurethane are also known as a binder for a gravel-sand mixture. Thus, EP 468 608 describes a drainage element for lining wells. It consists essentially of 20 to 30 parts by weight of a defined aggregate and 1 part by weight of a polyurethane-based binder. Filter gravel with a particle size of 1 to 4 mm is used as the aggregate. Curing takes place at 80° C. in the presence of a catalyst. The disadvantage is that grains of sand smaller than 1 mm in diameter have to be removed. In addition, curing at 80° C. is too laborious and hence too uneconomical. Finally, the polyurethane binder is not evenly distributed. A particularly harmful aspect is that "nests" of unwetted fines are formed to the detriment of strength.

WO 92/18702 describes liquid-permeable elements which are produced by joining several unsupported segments with a cast elastomer. The segments consist of a mixture of gravel, polyurethane and casting resin. The grain fraction consists of particles 2 to 8 mm and 2 to 4 mm in diameter. The binder makes up 5% by weight.

In their prospectus entitled "Ecofilter", the Laubag company describes a pressure-resistant unsupported gravel filter produced from a polyurethane binder and a quartz sand mixture with a particle size of 1 to 4 mm. It is distinguished by the following advantages: high permeability to water, long-life well column, excellent filter effect, suitable to a depth of 200 m and high mechanical strength, more particularly high impact strength. Nothing is said about the production of the gravel filter or, in particular, about the polyurethane binder used.

DE 40 23 005 describes a polyurethane system which is suitable, for example, for filter construction, for fitting glass in window frames and for the production of sandwich elements. The polyol component contains 15 to 100% by weight of polyol, 0 to 85% by weight of filler, 0 to 5% by weight of a drying agent, such as zeolite, 0 to 2% by weight of thickener, 0 to 2% by weight of other auxiliaries, for example dyes or catalysts, and 1 to 10% by weight of a thixotropicizing agent of a mixture of polyamidoamine with a low molecular weight polyfunctional amine.

Starting out from this prior art, the problem addressed by the invention was to provide a binder for granular material which would provide for the safe and simple production of open-cell moldings of high mechanical strength which, in particular, are non-toxic.

SUMMARY OF THE INVENTION

The solution provided by the invention is defined in the claims and lies essentially in the choice of a certain isocyanate/polyol casting resin based on the following components:

a) polyol,
b) polyisocyanate,
c) catalyst,
d) suspension aid and
e) other additives.

It is characterized in that the catalyst and the suspension aid are present in the casting resin in such concentrations that, within 10 minutes of mixing, it flows downwards a) by at least 15 cm at 25° C. and b) by at most 3, preferably 2 and, more preferably, 1 cm, but by at least 0.6 and preferably by at least 0.3 cm at 130° C. In this way, the viscosity of the reactive resin on the one hand is so low when it is stirred at room temperature that granular material is thoroughly wetted and, on the other hand, is so high in the event of an increase in temperature without stirring that a film in the vertical position does not flow downwards. A thermoset polyurethane is formed on curing of the resin.

DETAILED DESCRIPTION OF THE INVENTION

Basically, any polyols of the type already known for the production of polyurethanes are also suitable for the purposes of the present invention. They include in particular the polyhydroxypolyethers known per se with molecular weights in the range from 60 to 10,000 and preferably in the range from 70 to 6,000 containing 2 to 10 hydroxyl groups per molecule. Polyhydroxypolyethers such as these are obtained in known manner by alkoxylation of suitable starter molecules, for example water, propylene glycol, glycerol, trimethylol propane, sorbitol, cane sugar, etc. Suitable alkoxylating agents are, in particular, propylene oxide and even ethylene oxide. Another type of polyhydroxypolyether are the polytetrahydrofurans produced by ring-opening polymerization.

However, the usual polyester polyols with molecular weights of 400 to 10,000 may also be used providing they contain 2 to 6 hydroxyl groups. This is particularly the case when excellent stability to light and heat is required. Suitable polyester polyols are the reaction products known per se of excess quantities of polyhydric alcohols of the type already mentioned by way of example as starter molecules with polybasic acids, for example succinic acid, adipic acid, phthalic acid, terephthalic acid or mixtures of such acids. Esters and partial esters of saturated and unsaturated fatty acids with polyhydroxy compounds and ethoxylated or propoxylated derivatives thereof may also be used. A polyester diol of hexane diol and adipic acid is preferred. Finally, OH-functional prepolymers, i.e. oligomers of polyisocyanates and polyols in a large excess, and polyols based on polycarbonates, polycaprolactones and hydroxyl-terminated polybutadienes may also be used.

Suitable polyisocyanates are any polyfunctional aromatic and aliphatic isocyanates. They preferably contain an average of 2 to at most 4 NCO groups. The following are mentioned as examples of suitable isocyanates: 1,5-naphthylene diisocyanate, 4,4'-diphenylmethane diisocyanate (MDI), hydrogenated MDI ($H_{12}$MDI), xylylene diisocyanate (XDI), tetramethyl xylylene diisocyanate (TMXDI), 4,4'-diphenyl dimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of tolylene diisocyanate (TDI), optionally in the form of mixtures, 1-methyl-2,4-diisocyanatocyclohexane, 1,6-diisocyanato-2,2,4-trimethyl hexane, 1,6-diisocyanato-2,4,4-trimethyl hexane. 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanatoethyl ester. Other important diisocyanates are trimethyl hexamethylene diisocyanate, 1,4-diisocyanatobutane, 1,12-diisocyanatododecane and dimer fatty acid diisocyanate. Also of interest are trimerized isocyanates and isocyanatobiurets and partly masked polyisocyanates which provide for the formation of self-crosslinking polyurethanes, for example dimeric tolylene diisocyanate. Finally, prepolymers, i.e. oligomers containing several isocyanate groups, may also be used. As already known, they are obtained with a large excess of monomeric polyisocyanate in the presence of diols for example. In general, aromatic isocyanates are preferably used.

The polyols and polyisocyanates are preferably used in the form of a two-component casting resin, a low molecular weight polyisocyanate and a relatively low molecular weight polyol being mixed together only just before they are used. The polyisocyanate is used with an up to 50% excess of isocyanate, based on the polyol, preferably with a 10 to 30% excess.

Highly active tertiary amines or amidines and organometallic compounds and mixtures thereof are used as catalysts. Suitable amines are both acyclic and, in particular, cyclic compounds, such as tetramethyl butanediamine, 1,4-diazabicyclooctane (DABCO), 1,8-diazabicyclo-(5.4.0)-undecene. Suitable organometallic compounds are both iron and, in particular, tin compounds. Examples of iron compounds are 1,3-dicarbonyl compounds of iron, such as iron(III) acetyl acetonate.

The catalysts used are in particular organotin compounds. Organotin compounds are compounds containing both tin and an organic component, more particularly compounds containing one or more Sn—C bonds. Organic compounds in the broader sense also include, for example, salts such as tin(II) octoate and tin(II) stearate. Tin compounds in the narrower sense include, above all, compounds of tetravalent tin corresponding to the general formula $R_{n+1}SnX_{3-n}$, where n is a number of 0 to 2, R is an alkyl, aryl, alkaryl and/or aralkyl group and finally X is an oxygen, sulfur or nitrogen compound. The groups R or X may even be attached to one another and, in that case, form a ring together with the tin. Such compounds are described in EP 491 268, EP 490 277 and EP 423 643. R best contains at least 4 carbon atoms and, more particularly, at least 8 carbon atoms. The upper limit is generally 12 carbon atoms. In a preferred embodiment, n=0 or 1 and a mixture of 1 and 0. X is preferably an oxygen compound, i.e. an organotin oxide, hydroxide, alcoholate, β-dicarbonyl compound, carboxylate or ester of an inorganic acid. However, X may also be a sulfur compound, i.e. an organotin sulfide, thiolate or thioacid ester. Among the Sn—S compounds, thioglycolic esters, for example compounds containing the following groups:
—S—CH$_2$—CH$_2$—CO—O—(CH$_2$)$_{10}$CH$_3$ or
—S—CH$_2$—CH$_2$—CO—O—CH$_2$—CH(C$_2$H$_5$)—CH$_2$—CH$_2$—CH$_2$—CH$_3$
are of particular interest. Compounds such as these meet another criterion, namely: the molecular weight of the organotin compound should preferably be above 400 and, more particularly, above 250, more preferably above 600.

A preferred class of compounds are the dialkyl tin(IV) carboxylates (X=O—CO—R$^1$). The carboxylic acids contain 2, preferably at least 10 and more preferably 14 to 32 carbon atoms. Dicarboxylic acids may also be used. The following are specifically mentioned as acids: adipic acid, maleic acid, fumaric acid, malonic acid, succinic acid, pimelic acid, terephthalic acid, phenyl acetic acid, benzoic acid, acetic acid, propionic acid and, in particular, 2-ethylhexanoic acid, caprylic acid, capric acid, lauric acid, myristic acid, palmitic acid and stearic acid. Specific compounds are dibutyl and dioctyl tin diacetate, maleate, bis-(2-ethylhexoate), dilaurate; tributyl tin acetate, bis-(β-methoxycarbonylethyl)-tin dilaurate and bis-(β-acetylethyl)-tin dilaurate.

Tin oxides and sulfides and also thiolates may also be used. Specific compounds are bis-(tributyl tin)-oxide, bis-(trioctyl tin)-oxide, dibutyl and dioctyl tin-bis-(2-ethylhexyl thiolate), dibutyl and dioctyl tin didodecyl thiolate, bis-(β-methoxycarbonyl ethyl)-tin didodecyl thiolate, bis-(β-acetyl ethyl)-tin-bis-(2-ethyl hexyl thiolate), dibutyl and dioctyl tin didodecyl thiolate, butyl and octyl tin tris-(thioglycolic acid-2-ethyl hexoate), dibutyl and dioctyl tin-bis-(thioglycolic acid-2-ethyl hexoate), tributyl and trioctyl tin-(thioglycolic acid-2-ethyl hexoate) and butyl and octyl tin tris-(thioethylene glycol-2-ethyl hexoate), dibutyl and dioctyl tin-bis-(thioethylene glycol-2-ethyl hexoate), tributyl and trioctyl tin-(thioethylene glycol-2-ethyl hexoate) with the general formula $R_{n+1}Sn(SCH_2CH_2OCOC_8H_{17})_{3-n}$, where R is a C$_{4-8}$ alkyl group, bis-(β-methoxycarbonyl ethyl)-tin-bis-(thioethylene glycol-2-ethyl hexoate), -tin-bis-(thioglycolic acid-2-ethyl hexoate) and bis-(β-acetyl ethyl)-tin-bis-(thioethylene glycol-2-ethyl hexoate) and -tin-bis-(thioglycolic acid-2-ethyl hexoate).

The other groups of tin compounds mentioned include tributyl tin hydroxide, dibutyl tin diethylate, dibutyl tin dibutylate, dihexyl tin dihexylate, dibutyl tin diacetyl acetonate, dibutyl tin diethyl acetyl acetate, bis-(butyl dichlorotin)-oxide, bis-(dibutyl chlorotin)-sulfide, dibutyl and dioctyl tin dichloride, dibutyl- and dioctyl tin dithioacetate.

The catalyst is preferably added to the polyol. The quantity added is determined by the activity of the catalyst and by the reaction conditions and is preferably in the range from 0.01 to 0.5% by weight, based on the polyol.

The suspension aid is intended above all to stabilize the dust and the fillers in the isocyanate/polyol casting resin. To this end, their wetting in particular is extremely important. In addition, the particles are intended to be prevented from sedimenting. The thixotropicizing effect of the isocyanate/polyol casting resin is closely related to this: when mixed with the granular material and during casting into the molds, it should have a low viscosity. However, when the external forces abate, it should become viscous so that it does not flow downwards in the molds.

Specific substances which solve these problems include
—bentonites, i.e. impure clays formed by the weathering of volcanic tuffs, more particularly "bentones",
—highly disperse silica, i.e. a silica containing more than 99.8% by weight of SiO$_2$, which is produced by hydrolysis of silicon tetrachloride in an oxyhydrogen flame, more particularly "Aerosil",
—a mixture of a) silica and b) dimethyl sulfoxide, polyoxyalkylene glycol and derivatives thereof, more particularly with terminal siloxane groups, or polyethylene fibers, more particularly mixtures of amorphous silica and fibrillated polyethylene fibers (Sylothix-53),
—hydrogenated castor oil either on its own or together with ethylene-bis-stearamide or bis-(stearoyl palmitoyl)-ethylenediamine (Hoechst-Wachs-C),
—surface-treated calcium carbonate.

LiCl, carbonate black, mixtures of polyamidoamine and low molecular weight amines (see DE 40 23 005), fine-particle polyureas of aliphatic or aromatic polyamines and isocyanates and also isocyanate derivatives prepared in situ are additionally mentioned.

The suspension aid is used in a quantity of up to 10% by weight and, more particularly, in a quantity of 0.5 to 5%, based on the polyol. It should be used in a larger quantity, the larger the dust content of the gravel/sand mixture. This leads both to better wetting of the dust and to better binding of the dust both in the cured mixture and in the uncured mixture of isocyanate/polyol casting resin and granular material. Accordingly, both the dust content of the air and the storage stability of the moldings in water are improved. The suspension aid is also preferably added to the polyol.

The isocyanate/polyol casting resin may also contain other additives, including above all fillers. Fillers are used not only to increase volume, but also to improve technical properties, particularly flow behavior. Suitable fillers are carbonates, more particularly lime spar, limestone, chalk and coated calcium carbonate and magnesium/calcium carbonate double salts, such as dolomite, sulfates, such as barium and calcium sulfate, oxides and hydroxides, such as aluminium oxide, hydrated aluminium oxides, silicates, such as kaolin, feldspar, wollastonite, mica, clay and talcum and also silicon dioxide (silica flour), kieselguhr, graphite or glass fibers. The fillers are also preferably added to the polyol component in a quantity of up to 70% by weight and preferably in a quantity of 10 to 60% by weight, based on the resin component.

A water-binding agent, more particularly an alkali metal aluminium silicate (zeolite L paste) is also added to the polyol. It is used in a quantity of up to 10% by weight and preferably in a quantity of 1 to 5% by weight, based on the polyol.

The polyol may also contain special additives, such as dispersants, thickeners or thixotropicizing agents, where the suspension aid is unsatisfactory in this regard.

Other suitable additives are pigments, flameproofing agents, stabilizers, coupling agents, etc.

Depending on the actual conditions, it may be advisable to stabilize the polyurethane against degradation. Suitable antioxidants are, in particular, up to 1.5% by weight of Irganox 1010, 1076, 3114 and 1425 of Ciba Geigy; Topanol O of ICI; and Goodrite 2114 of Goodrich. Suitable UV absorbers are, in particular, up to 1.5% by weight of Tinuvin P, 328 and 144 (Ciba Geigy), Sanduvor VSU and 3035 (Sandoz), Chimassorb 81 (Chimosa). Suitable sterically hindered amine-based light stabilizers are up to 1.5% by weight of Tinuvin 765 and 770 (Ciba Geigy), Sanduvor 3050, 3051 and 3052 (Sandoz) and Chimassorb 119 (Chimosa) and also Mar LA 62, 63, 67 and 68 (Argus Chemical Corporation).

The additives are incorporated in the polyol in known manner. The so-called resin is obtained in this way. Additives may also be incorporated in the polyisocyanate. However, this is not normal, i.e. the curing agent preferably consists of the polyisocyanate.

Several polyols, polyisocyanates, catalysts, suspension aids and additives performing the same function may of course also be used.

The isocyanate/polyol casting resin is used as binder instead of the inorganic binders otherwise typically used, for example instead of cement. The aggregate and the additives are similar to those typically used in the building materials sector. Suitable aggregates are granular materials, more particularly minerals in the form of broken and/or unbroken rock. Apart from their granulometry, their chemical composition is of minor importance. The aggregates may be such substances as silicon dioxide, silicates, coal, limestone, corundum, silicon carbide, metals, solid or hollow beads of glass or plastics, expanded clay, vermiculite, perlite, pumice gravel or slags. Silicon dioxide is preferably used in the form of sand and gravel. Quartz sand containing more than 85% quartz is particularly suitable. Its grains are largely rounded and have a diameter of 0.06 to 2 mm. Corresponding materials with a diameter of more than 2 mm are known as gravel. Fine gravel with a grain size of 2 to 6.3 mm is of particular importance for the present case.

A gravel/sand mixture of which the particles have a maximum diameter of 6.3 mm and preferably 4 mm is preferably used. It is crucial to the process according to the invention that granular materials smaller than 1 mm in diameter can also be used, making up as much as 10% by weight of the mixture. Half of these granular materials can be smaller than 0.2 mm in diameter. Accordingly, a gravel/sand mixture containing 5% by weight of dust can be used. The grain size distribution is determined in known manner by sieve analysis.

However, a large percentage content of fine and medium grain sand reduces permeability to water. Permeability to water can be adjusted as required by varying the percentage contents. A molding of a mixture of two sand fractions with a diameter of 0.20 to 1.0 and 1.0 to 2.0 in a ratio of 1:1 gives a substantially water-impermeable molding when processed with the casting resin. The dust component may even be already incorporated as filler in the isocyanate/polyol casting resin.

Given a suitable grain size distribution, therefore, the original gravel/sand mixture need only be washed in order, for example, to remove all organic and all swellable constituents. There may be no need to remove the dust components by sieving. The washed gravel/sand mixture is dried with hot air and, finally, stored in silos under typical environmental conditions. However, the gravel/sand mixture is preferably mixed before storage with part of the polyol, particularly where the mixture has a high dust content. The polyol may also contain other components, such as fillers, suspension aids and catalyst. This pretreatment leads to complete wetting of the gravel/sand/dust mixture and hence to complete encapsulation of the individual particles. In this way, not only is the dust content in the air during production of the moldings reduced, the stability of the moldings to water in storage is also increased.

The ratio by weight of quartz sand to polyurethane binder is preferably less than 20:1 and, more particularly, 16:1 or less. With a particle size of 1.6 to 4.0 mm, equal quantities by weight of quartz sand and binder are required for filters with a water flow rate of 0 $m^3/min \cdot m^2$. In the case of a sand with a grain size of up to 4 mm, but with 20% by weight of particles less than 1.6 mm in size, based on the total quantity of sand, the binder content for the same type of filter is reduced to around 10% by weight, based on the sand as a whole.

Suitable additives are products similar to those using concrete, for example, to achieve certain additional effects, for example pigments for coloring, glass fibers for strengthening and sharp-edged materials for non-slip finishing.

The open-cell moldings are produced from the isocyanate/polyol casting resin and the granular materials and, optionally, other additives in principle by the casting process.

To this end, the two components of the isocyanate/polyol casting resin are first measured and mixed, namely the polyol together with the catalyst, the suspension aid and optionally additives as the first component and the polyisocyanate as the second component.

In general, these isocyanate/polyol casting resins and the granular material and optionally other additives are then measured and mixed at room temperature until the solid constituents are wetted by the resin. This molding composition is then cast into the vibrated mold with the required dimensions in the absence of pressure. In the case of elongate molds, it can be of advantage to apply a pressure of, for example, $15M/cm^2$. In addition, a nonwoven, a knitted fabric or a mat of glass or metal may be placed in the mold for reinforcement. It is also possible to apply a surface layer of decorative material, for example white pebbles. A layer of active carbon granules may also be incorporated to obtain a barrier layer in the molding. The molds are generally not preheated and are coated with a commercially available release agent.

For curing, the molds are heated with their contents to a temperature of 80° to 150° C., for example in a recirculating air oven. Heating can last up to 2 hours, preferably up to 1 hour and, more preferably, up to 10 minutes. The heating time begins with the introduction of the molding composition into the molds and ends with demolding.

The moldings are best not cooled to 25° C. before demolding, preferably not to 50° C. and, more preferably, not at all, i.e. the moldings are removed from the mold at virtually the reaction temperature. The moldings are demolded when no more volatile isocyanate is present and the moldings have been cured to such an extent that they can be handled without difficulty. Handling includes not only demolding, but also transport, storage and any aftertreatment to which the moldings may be subjected. The strengths of the moldings increase significantly over a period of 1 day. This post-cure time depends upon the storage temperature, the moisture (atmospheric humidity, liquid water) and the dimensions of the molding.

The molds are permanent molds. They need not be cleaned after each use, but only after they have been used 10 or 20 times.

The installation used to produce the moldings is preferably designed for a continuous semi-automatic batch process.

The moldings thus produced have excellent properties which are attributable above all to the polyurethane binder and to its distribution in the granular material.

The polyurethane binder is substantially inert to water. The water quality is not affected even after a contact time of 7 days. This applies not only to the color, odor, clarity and surface tension of the water, but also and above all to its amine content. Accordingly, the moldings are suitable for use as fittings in the production of drinking water.

The polyurethane binder is distributed in the granular material in such a way that a cell system is formed. The cell volume amounts to between 30 and 50% by volume, expressed as the volume of the cells, based on the volume of the moldings. Accordingly, the moldings are lighter by up to about half than correspondingly dimensioned compact moldings containing cement as binder. Thermal conductivity is also reduced by the cells.

The cell system is open, i.e. the moldings are permeable. They allow gases and liquids, for example liquid or gaseous water, air or polar liquids, to pass through. Their permeability to water is variable. It can be substantially 0 or high even in the absence or substantial absence of pressure, so that rain water is able to trickle through without collecting.

Permeability to water can be varied as required by suitably selecting the particle size and particle size distribution. This applies both in regard to the cell volume as a whole and in regard to the cell size distribution over the cross-section of the molding. An asymmetrical cell system such as this can be built up, for example, by applying to a layer of medium-grain material (1 to 3 mm) a second layer of coarse-grain material (3 to 10 mm). A layer of fine-grain material (0.3 to 1.0 mm) should only be very thin to ensure that permeability is not reduced substantially to zero.

Favorable mechanical properties are established through the uniform distribution of the PUR binder in the granular material. The strength of the moldings is surprisingly favorable for an organic binder. This applies both to their compressive strength and tensile strength and to their flexural strength. Their impact strength is extremely high. If these values are not good enough for special applications, they can be further increased by reinforcing materials. The high strength values can be kept substantially constant for years by choosing suitable starting materials and adding stabilizers. Thus, hydrolysis stability, for example, can be significantly improved by using a polyether polyol instead of a polyester polyol.

By virtue of these valuable properties of the open-cell moldings, they are suitable for applications where a permeate is to be removed in the absence of pressure, for example water by trickling, and for applications where the molding is under high pressure, for example in a deep well.

EXAMPLES

The invention is illustrated by the following Examples:

Example 1

The isocyanate/polyol casting resin mixture is prepared from the two components polyol with additives (resin) and isocyanate (curing agent). The polyol component consists of 33% by weight of polypropylene diol and 10% by weight of polyether triol, 10% by weight of zeolite paste, 45% of chalk, 1.6% of pyrogenic silica and less than 1% of dibutyl tin dilaurate. 3 Parts by weight of this resin are mixed with 1 part by weight of the polyisocyanate diphenylmethane-4,4-diisocyanate with a functionality of 2.7 at room temperature in a dynamic mixer. The isocyanate/polyol casting resin is obtained in this way. The filling composition is prepared from 1 part by weight of this isocyanate/polyol casting resin and 16 parts by weight of a gravel/sand mixture by mixing and shaking at room temperature. The gravel/sand mixture contains 95% by weight of particles 1 to 4 mm in diameter and 5% by weight of particles smaller than 1 mm in diameter.

The filling composition is cast at room temperature into the vibrating mold which is coated with a Teflon spray. In addition, a particular pressure is applied. Curing takes place in about 10 minutes at 140° C. in a recirculating air oven. After cooling to room temperature, the molding is removed from the mold.

Example 2

Variation of the Curing Temperature at Two Stirring Speeds

| A) Isocyanate/polyol casting resin | |
|---|---|
| | Quantities in % by weight |
| a) Resin component | |
| Polypropylene glycol, OHV about 180, difunctional | 13.00 |
| Polypropylene glycol, OHV about 240, difunctional | 28.00 |
| Castor oil | 5.00 |
| Na—Al silicate in castor oil (1:1 mixture) | 6.00 |
| Silica (Aerosil 150) | 2.00 |
| Dibutyl tin dilaurate | 0.02 |
| Limestone flour | 45.98 |
| b) Curing component | |
| Diphenylmethane-4,4'-diisocyanate | 100.00 |
| Resin:curing agent | 100:30 |

200 g of resin and 60 g of curing agent are placed in a 10 cm diameter metal can and mixed for 1 minute at room temperature (23° C.) with an electrically operated metal blade stirrer (blade width 4 cm) and then cured at various temperatures.

Immediately after mixing, the isocyanate/polyol casting resin is knife-coated onto a degreased steel plate in the form of a 10 cm long rectangular strip 1 mm thick and 1 cm wide. The steel plate has been preheated to the curing temperature and, immediately after application of the resin, is placed vertically in a drying cabinet so that the strip of casting resin is horizontally positioned. After curing for 10 minutes at the temperatures shown in the following Tables, the running behavior of the casting resin is determined.

This is followed by the production of two comparison samples in accordance with the indicated formulation, the only difference between the two samples being that they are mixed at different stirring speeds, namely 100 r.p.m. and 1000 r.p.m.

| Temperature in °C. | Mixing r.p.m. | Running in cm |
|---|---|---|
| 25 | 100 | >15 |
| 25 | 1000 | >15 |
| 80 | 100 | 10–11.5 |
| 80 | 1000 | >15 |
| 130 | 100 | 0.3–0.6 |
| 130 | 1000 | 3.8–4.5 |

The running of the casting resin on the steel plates may be regarded as a measure of its wetting power. According to the data set out in the Table, the reduction in viscosity can be increased by increasing the stirring speed to 1000 r.p.m.

B) Mixture of Casting Resin and Gravel/Sand Mixture

Gravel/sand mixture and isocyanate/polyol casting resin (mixing ratio 16:1) are mixed in a screw mixer and introduced into a 1 meter deep production mold at a mold temperature of 25° C. and 80° C. The isocyanate/polyol casting resin runs down the upper part of the mold to a considerable extent. Parts of the cured filter tubes can easily be broken off by hand at their upper ends. By contrast, the amount of resin in the lower half of the tubes is considerably greater and the water throughflow rate in the lower third of the tube is virtually 0 m³/min·m².

In contrast to these two tests, a filter tube in which the resin is distributed substantially uniformly over the entire length of the tube can be produced in 10 minutes at 130° C.

Example 3

Variation of the Suspension Aid

In two comparison tests with casting resins as in Example 2A, in which half and then all the Aerosil 150 was replaced by limestone flour, the casting resin applied by knife coating runs down by more than 15 cm in the temperature range from 25° to 130° C. The reduction in viscosity by mixing and increasing the temperature cannot be compensated by the advancing chemical reaction alone to the same extent as achieved by the combination of reaction and Aerosil. If, by contrast, 0.5% of limestone flour is replaced by Aerosil, no running of the casting resin is observed at 130° C.

Useful filter tubes cannot be produced in the production unit either with quantities of Aerosil below 2% or with quantities of Aerosil above 2%. In the first case, the distribution of the casting resin in the filter differs to a considerable extent. Small quantities in the upper part and large quantities in the lower part lead to different strengths and water permeation rates. In the second case, the filter has no strength. On account of the absence of flow behavior, the points of adhesion between the individual particles could not be properly formed.

Example 4

Variation of the Catalyst Concentration

The described resin component (see Example 2A) is prepared with quantities of catalyst (dibutyl tin dilaurate) of 0.015, 0.018 and 0.023% and compared for running behavior with the original formulation containing 0.020% of catalyst. The stirring speed during mixing of the isocyanate and polyol is 100 r.p.m. The following running values (in cm) were measured by the method described in Example 2A:

| | Quantity of catalyst [%] | | | |
|---|---|---|---|---|
| Temp. | 0.015 | 0.018 | 0.020 | 0.023 |
| 80° C. | >15 | >15 | >15 | >15 |
| 130° C. | 13.5–14.5 | 6.9–9 | 0.6–0.3 | 0.0 |

Filter tubes were produced with the systems containing 0.018 and 0.023% of catalyst at a mold temperature of 130° C. With 0.018% of catalyst, there are clear differences in the distribution of the casting resin. The large quantity of resin in the bottom 20 cm of the filter tube is particularly noticeable. Although uniform distribution of the casting resin is obtained with 0.023% of catalyst, the strength of the tube is very poor. Moldings broke during demolding. Investigations into the structure of the filter tube show that the points of adhesion between the individual gravel particles had not been properly formed. The viscosity of the system had increased excessively by the time the mold was completely full.

For the production of filter tubes, the curing temperature, the suspension aid and the concentration of catalyst were adapted to the predetermined mixing ratios in the screw mixer. The reduction in viscosity during mixing of casting resin and gravel/sand mixture with a screw in the production unit is simulated in the laboratory by stirring the casting resin at a speed of 100 r.p.m.

Comparison of the laboratory tests with production of the filter tubes in the production unit shows that particular running behavior of the system is necessary for the production of filter tubes with uniform strength distribution. In the variant of application variant used for the laboratory tests, this particular running behavior is 0.3 to 0.6 cm at 130° C.

The Examples show that, for a given composition of polyols, polyisocyanates and additives, the concentration of catalyst and suspension aid can only be varied within very narrow limits if the PU is to be uniformly distributed in the end product. This narrow range can be determined for each individual case by a few routine tests. It was fortunate that these conditions were ascertained because it had not been expected that such considerable variations in the viscosity behavior would be able to be achieved in view of the sudden changes in temperature and shearing.

We claim:

1. A composition useful as a casting resin, said composition comprising: a polyol, a polyisocyanate, a catalyst, and a suspension aid, wherein said catalyst and said suspension aid are present in the casting resin in such concentrations that, within 10 minutes of mixing, the composition flows downwards a) by at least 15 cm at 25° C. and b) by 3 to 0.3 cm at 130° C.

2. A composition as claimed in claim 1 wherein said composition has an isocyanate excess of up to 50%, based on reactive hydroxyl groups.

3. A composition as claimed in claim 1 wherein said composition has an isocyanate excess of 10 to 30%, based on reactive hydroxyl groups.

4. A composition as claimed in claim 1 wherein said catalyst is an organotin catalyst.

5. A composition as claimed in claim 1 wherein said catalyst is an organotin catalyst with a molecular weight of more than 250.

6. A composition as claimed in claim 1 wherein said catalyst is an organotin catalyst with a molecular weight of more than 600.

7. A composition as claimed in claim 1 wherein said suspension aid contains silicon.

8. A composition as claimed in claim 1 wherein said suspension aid is selected from the group consisting of bentonites and highly disperse silica.

9. A composition useful as a casting resin, said composition comprising: a polyol, a polyisocyanate, said polyisocyanate being in excess of 10 to 30%, based on reactive hydroxyl groups, an organotin catalyst with a molecular weight of more than 600, and a suspension aid selected from the group consisting of bentonites and highly disperse silica, wherein said organotin catalyst and said suspension aid are present in the casting resin in such concentrations that, within 10 minutes of mixing, the composition flows downwards a) by at least 15 cm at 25° C. and b) by 3 to 0.3 cm at 130° C.

10. A process for the production of open-cell moldings comprising casting a mixture of a granular material with a composition as claimed in claim 1.

11. A process as claimed in claim 10 wherein the casting product has a cell volume of 30 to 50% by volume and permeability to water.

12. A process as claimed in claim 10 wherein up to 10% by weight of the granular material is smaller than 1.0 mm in diameter.

13. A process as claimed in claim 10 wherein the granular material is selected from the group consisting of gravel, sand, and mixtures thereof.

14. A process as claimed in claim 10 wherein said granular material is further comprised of dust.

15. A process as claimed in claim 10 wherein up to 5% by weight of the granular material is smaller than 0.2 mm in diameter.

16. A process as claimed in claim 10 wherein the granular material is pretreated with the polyol component or with the resin produced therefrom.

17. Open-cell moldings comprising a granular material and a binder therefor which binder is the reaction product of a casting resin comprising a mixture of a polyol and a polyisocyanate a catalyst and a suspension aid, wherein said catalyst and said suspension aid are present in the casting resin in such concentrations that, within 10 minutes of mixing, it flows downwards a) by at least 15 cm at 25° C. and b) by 3 to 0.3 cm at 130° C., said open-cell molding having a cell volume of 30 to 50% by volume.

18. An open-cell molding as claimed in claim 17 wherein said molding does not affect water in contact with them to a significant extent, if at all, after one week.

19. An open-cell molding as claimed in claim 17 wherein said mixture of a polyol and a polyisocyanate has an isocyanate excess of up to 50%, based on reactive hydroxyl groups.

20. An open-cell molding as claimed in claim 17 wherein said mixture of a polyol and a polyisocyanate has an isocyanate excess of 10 to 30%, based on reactive hydroxyl groups.

21. An open-cell molding as claimed in claim 17 wherein said catalyst is an organotin catalyst.

22. An open-cell molding as claimed in claim 17 wherein said catalyst is an organotin catalyst with a molecular weight of more than 250.

23. An open-cell molding as claimed in claim 17 wherein said catalyst is an organotin catalyst with a molecular weight of more than 600.

24. An open-cell molding as claimed in claim 17 wherein said suspension aid contains silicon.

25. An open-cell molding as claimed in claim 17 wherein said suspension aid is selected from the group consisting of bentonites and highly disperse silica.

26. An open-cell molding as claimed in claim 17 wherein up to 10% by weight of the granular material is smaller than 1.0 mm in diameter.

27. An open-cell molding as claimed in claim 17 wherein the granular material is selected from the group consisting of gravel, sand, and mixtures thereof.

28. An open-cell molding as claimed in claim 17 wherein said granular material is further comprised of dust.

29. An open-cell molding as claimed in claim 17 wherein up to 5% by weight of the granular material is smaller than 0.2 mm in diameter.

30. An open-cell molding as claimed in claim 17 wherein the granular material is pretreated with the polyol component or with the resin produced therefrom.

31. Open-cell moldings comprising a granular material and a binder therefor which binder is the reaction product of a casting resin comprising mixture of a polyol and a polyisocyanate, said polyisocyanate being in excess of 10 to 30%, based on reactive hydroxyl groups, an organotin catalyst with a molecular weight of more than 600, and a suspension aid selected from the group consisting of bentonites and highly disperse silica, wherein said organotin catalyst and said suspension aid are present in the casting resin in such concentrations that, within 10 minutes of mixing, it flows downwards a) by at least 15 cm at 25° C. and b) by 3 to 0.3 cm at 130° C.

* * * * *